(12) United States Patent
Gold

(10) Patent No.: US 7,768,395 B2
(45) Date of Patent: Aug. 3, 2010

(54) BRAND MAPPING

(76) Inventor: Steven K. Gold, 69 Fifer La., Lexington, MA (US) 02420

( * ) Notice: Subject to any disclaimer, the term of this patent is extended or adjusted under 35 U.S.C. 154(b) by 697 days.

(21) Appl. No.: 11/758,392

(22) Filed: Jun. 5, 2007

(65) Prior Publication Data

US 2007/0257792 A1   Nov. 8, 2007

Related U.S. Application Data

(60) Provisional application No. 60/885,773, filed on Jan. 19, 2007.

(51) Int. Cl.
*G08B 1/00* (2006.01)
(52) U.S. Cl. .................................................. 340/539.2
(58) Field of Classification Search .............. 340/539.2, 340/995.1, 691.6; 705/14.49
See application file for complete search history.

(56) References Cited

U.S. PATENT DOCUMENTS

| | | | |
|---|---|---|---|
| 5,627,549 A * | 5/1997 | Park ........................... | 701/300 |
| 6,128,571 A | 10/2000 | Ito | |
| 6,138,072 A | 10/2000 | Nagai | |
| 6,157,814 A | 12/2000 | Hymel | |
| 6,360,167 B1 * | 3/2002 | Millington et al. .......... | 701/211 |
| 6,493,630 B2 | 12/2002 | Ruiz | |
| 6,816,778 B2 | 11/2004 | Diaz | |
| 6,920,328 B2 | 7/2005 | Wollrab | |
| 7,089,110 B2 | 8/2006 | Pechatnikov | |
| 7,089,264 B1 * | 8/2006 | Guido et al. ................ | 1/1 |
| 7,142,205 B2 | 11/2006 | Chithambaram | |
| 7,174,303 B2 | 2/2007 | Glazer | |
| 7,450,003 B2 * | 11/2008 | Weber et al. ............. | 340/539.2 |
| 2002/0023010 A1 * | 2/2002 | Rittmaster et al. ............ | 705/26 |
| 2002/0032035 A1 * | 3/2002 | Teshima ...................... | 455/456 |
| 2004/0021584 A1 | 2/2004 | Hartz | |
| 2005/0050027 A1 | 3/2005 | Yeh | |
| 2006/0064348 A1 | 3/2006 | Li | |
| 2006/0085392 A1 | 4/2006 | Wang | |
| 2006/0241859 A1 | 10/2006 | Kimchi | |
| 2006/0286989 A1 * | 12/2006 | Illion ...................... | 455/456.3 |
| 2008/0015983 A1 | 1/2008 | Spikes | |

FOREIGN PATENT DOCUMENTS

| | | |
|---|---|---|
| JP | 2001337959 A | 12/2001 |
| WO | 01/28270 A1 | 4/2001 |
| WO | 0128270 A1 | 4/2001 |
| WO | 02/067083 A2 | 8/2002 |

OTHER PUBLICATIONS

NetVisualize web page, http://www.netvisualize.com, accessed on Jan. 29, 2007.

(Continued)

*Primary Examiner*—Phung Nguyen
(74) *Attorney, Agent, or Firm*—Robert Plotkin, P.C.

(57) ABSTRACT

A user uses a portable electronic device to select an image representative of a brand. In response to the user's selection of the image representative of the brand, the device automatically presents the user with an image of a map that indicates a current location of the device and shows one or more images representative of brand purchase sites where the selected brand may be accessed by the user.

62 Claims, 4 Drawing Sheets

OTHER PUBLICATIONS

Zvents blog, http://web.archive.org/web/20051013081052/blog.zvents.com/, Oct. 9, 2005.
Zvents blog, http://web.archive.org/web/20051013081052/http://blog.zvents.com/articles/2005/10/01/google-map-view-search-results, Oct. 1, 2005.
Zvents blog, http://www.zvents.com/welcome/search_results_map, Oct. 5, 2005.
Mapdango, http://www.mapdango.com/, accessed on Feb. 23, 2009.
Plazes, http://www.plazes.com/, accessed on Feb. 23, 2009.
Whrrl, http://www.whrrl.com/, accessed on Feb. 23, 2009.
Community Walk, http://www.communitywalk.com/, accessed on Feb. 23, 2009.
Trulia, http://www.trulia.com/, accessed on Feb. 23, 2009.
Where.com web site, http://www.where.com, visited on Apr. 27, 2009.
Where.com media kit, http://www.where.com/jin/welcome.jin, 2008.
Krillion.com web site, visited on Feb. 28, 2007.
GlobExplorer web site, visited on Jan. 29, 2007.
Wists Beta web site, visited on Jan. 29, 2007.
Smart Visual Bookmark Manager web site, visited on Jan. 29, 2007.
A-Z Maps web site, visited on Jan. 29, 2007.
Telenav web site, visited on Jan. 29, 2007.
Garmin Map & Chart Products web site, visited on Jan. 29, 2007.
OpenStreetMap.org web site, visited on Jan. 29, 2007.
Rand McNally Maps, Driving Directions, and Travel Store web site, visited on Jan. 25, 2007.
TeleAtlas web site, visited on Jan. 25, 2007.
Navteq web site, visited on Jan. 25, 2007.
Microsoft MapPoint web site, visited on Jan. 25, 2007.
MapQuest web site, visited on Jan. 25, 2007.
Google Mobile web site, visited on Jan. 25, 2007.
Google Maps web site, visited on Jan. 25, 2007.
Yahoo Maps web site, visited on Jan. 25, 2007.

\* cited by examiner

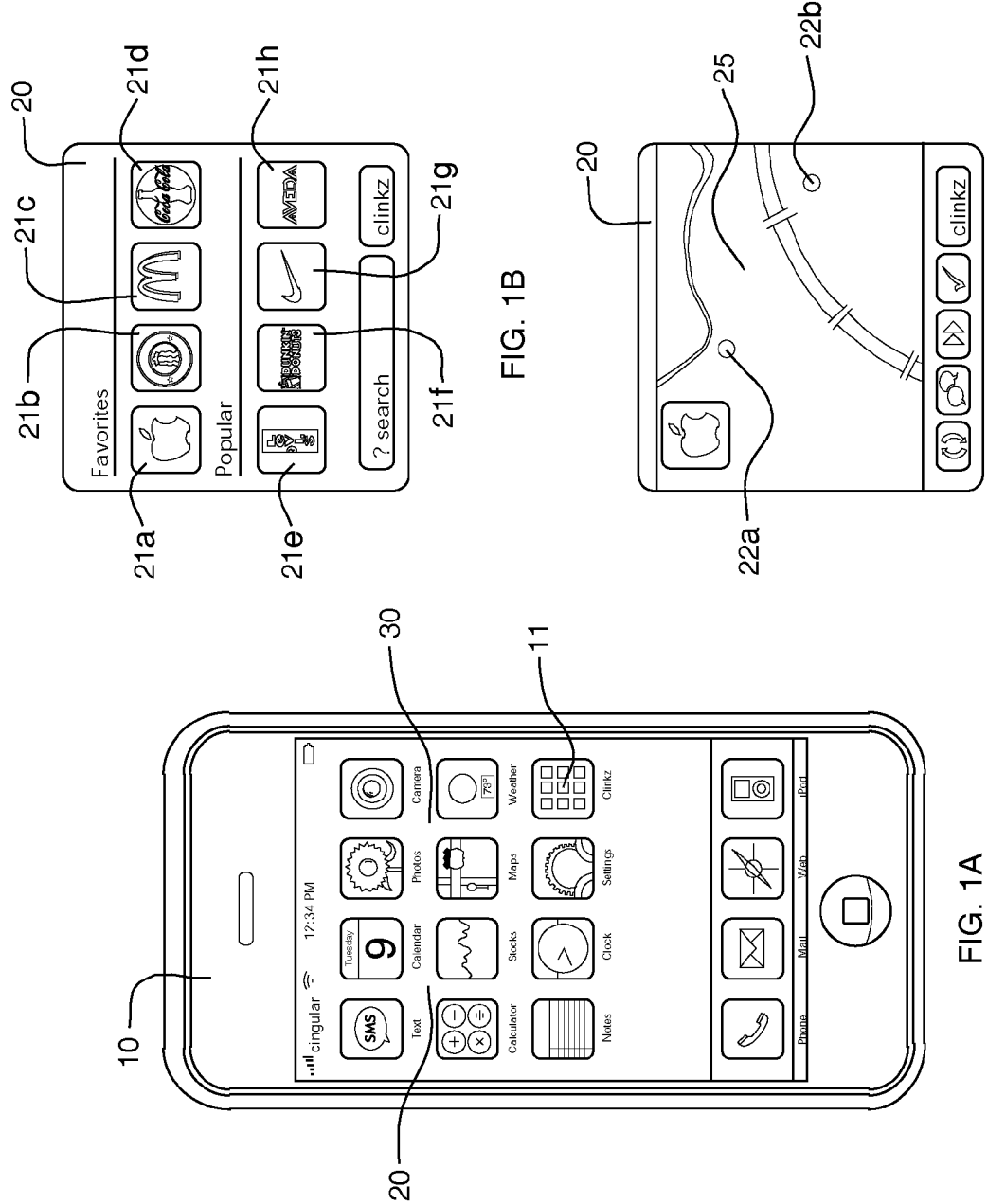

BRAND MAPPING

CROSS REFERENCE TO RELATED APPLICATIONS

This application claims priority from U.S. Provisional Patent Application Ser. No. 60/885,773, filed on Jan. 19, 2007, entitled "Consumer Brand Links," which is hereby incorporated by reference.

BACKGROUND

Various conventional computer-based systems exist for displaying maps to users. Such systems generally work in one of three ways:
1. A user actively specifies (inputs) location-identifying information, such as an address or zip code, in response to which the system generates and presents a map of the user-specified location. Subsequently, the user might also be able to specify a business name or category, in response to which the system may display the location(s) of the specified business name or type on the map. In general, such systems are unable to determine a location of the device independent of user input specifying a location or location-related information, and therefore require a user to specify a location. While some such systems may store previously entered location identifying information specified by a user, these systems would not be aware if a device changed location without further information from the user. In the case of a system that requires a user to specify a location or location-related information (meaning that the system is not independently aware of the user's location), the map is static and does not automatically update with movement of the device, although map centering and scale may be alterable by a user of such a system.
2. A system automatically identifies a location of a device, and generates a map based on the location of the device. In this case, the user may specify a business name or type, in response to which the system may display the location(s) of the specified business name or type on the map. Although the map position may be updated in this case based on the location of the device, the sequence of map selection followed by selection and then presentation of a business type or name remain the same as in the first type of system described.
3. A user specifies a business name or type, in response to which the system displays the location(s) of the specified business name or type on a map. Although in some instances a user may be prompted for location-identifying information to more closely determine the user's location, for example, such as a city name or zip code, this makes use of the methodology described with respect to the first type of system above.

The prior art, in general, enables a user to provide an address, business name, or business type, resulting in the identification of one or more real property locations corresponding to the provided address, business name, or business type.

Users continually seek new and improved ways to find and view geographic information more quickly and easily. What is needed, therefore, are improved techniques for enabling users to find and view such information.

SUMMARY

In one embodiment of the invention, a user of a portable electronic device uses the device to select an image identifying a brand. In response to the user's selection of the image identifying the brand, the device automatically presents the user with an image of a map that indicates a current location of the device and shows one or more images representative of brand access sites where products and/or services of the selected brand may be accessed (e.g., purchased) by the user. For example, if the user selects a logo for a particular brand of soft drink product, the device may present the user with an image of a map that has been automatically centered about the current location of the user and that shows shops, restaurants, vending machines, etc. where soft drink products having the selected brand may be accessed (e.g., purchased). Products and services having a particular brand may be available for purchase at multiple brand access sites that sell a wide range of different brands of products and services, or brand access sites that sell a single brand of product or service, or both. Furthermore, a brand access site does not need to be located at a real property address, meaning that the location of the brand access site could be a vending machine, for example, or another location that does not have a real property address, or an address that is generally known.

For example, one embodiment of the present invention is a method comprising: (A) displaying, using a device, a first image associated with a first brand (such as a photograph or illustration associated with the first brand); (B) receiving, from a user of the device, an indication of a selection by the user of the first image (such as by a single mouse click on the first image); (C) identifying a first location of the device independently of any location-specifying input provided by the user to the device (such as by using GPS or an RFID system); (D) identifying a first brand access site at which a first branded entity (e.g., a product or service) having the first brand may be accessed; and (E) providing to the user, using the device, a first map image which describes a first geographic area derived from the first location of the device and which includes a first indication of the first brand access site.

For the user to select the first image, a plurality of images (e.g., logos) associated with a plurality of brands may be displayed to the user. The user may select a particular one of the plurality of images. The method may provide the user with a first map image which describes a first geographic area derived from the first location of the device and which indicates a first physical location of a first brand purchase site at which the first branded entity may be purchased. The first map may indicate a plurality of brand access site associated images representing a plurality of brand access sites at which the first branded entity may be accessed.

The method may provide the first map image to the user by: (D)(1) identifying a plurality of brand access sites, each of which is associated with at least the first brand; (D)(2) identifying a subset of the plurality of brand access sites (such as those brand access sites within a geographic area described by the first map), wherein each member of the subset is associated with the first brand; and (D)(3) providing to the user a first map image which includes, for each brand access site that is a member of the subset, an indication of a brand access site.

The user may select the first brand access site, and the method may perform additional steps based on the user's selection. For example, the method may dial a telephone number of the first brand access site, present to the user a web site associated with the first brand, or provide the user with directions to the first brand access site.

The method may update the first map image over time. For example, the method may: (E) identify a second device location independently of any location-specifying input provided by the user to the device; and (F) in response to identifying the second device location, provide to the user, using the device, a second map which describes a second geographic area overlapping with a location in proximity to the second device location and which includes a second indication of a second brand access site at which the first brand is accessible.

Other features and advantages of various aspects and embodiments of the present invention will become apparent from the following description and from the claims.

BRIEF DESCRIPTION OF THE DRAWINGS

FIG. 1A illustrates a device for receiving user input and displaying a map image in response to such input according to one embodiment of the present invention;

FIG. 1B illustrates a graphical user interface for receiving user input specifying a brand according to one embodiment of the present invention;

FIG. 1C illustrates a map displayed by the device of FIG. 1A and including indications of physical locations of brand access sites at which products or services having the brand specified by the user may be accessed (e.g., purchased);

DETAILED DESCRIPTION

Embodiments of the present invention are directed to a device that enables a user to view one or more brand identifying images, such as one or more logos, on a display, and to select a particular brand identifying image using input means to thereby enable the presentation of a map image indicating a current location of the device and showing the locations of any one or more brand access sites for the selected brand that are located in proximity to the user (i.e., within the geographic area presented on the map). The system benefits users, for example, by facilitating the location and purchase of brands of products and services selected by the user by automatically directing (i.e., independently of location-specifying information provided by the user) the user to a nearby location where the selected brand of products or services may be available for purchase.

A "brand" is defined as a distinctive identity of a collection of related products or services. A "branded entity" of a particular brand is defined as a product or service having the particular brand. For example, a bottle of a Coca-Cola brand soft drink is an example of a "branded entity" of the Coca-Cola brand of soft drinks. A "brand access site" for a particular brand is defined as a location at which one or more branded entities of the particular brand may be accessed.

In general, as used herein, branded entities of a brand may be accessed (e.g., purchased) by a consumer at one or more brand access sites. In some instances, for example, a brand of products is marketed or sold under a common trademark. In other instances, for example, a brand of services is marketed or sold under a common servicemark. One example of a brand of products is the Coca-Cola brand of beverages. Another example of a brand of products is the iPod brand of consumer electronics. Yet another example of a brand of services is the Jiffy Lube brand of oil change services. Yet another example of a brand of services is the H&R Block brand of tax preparation services.

Figure 2A:
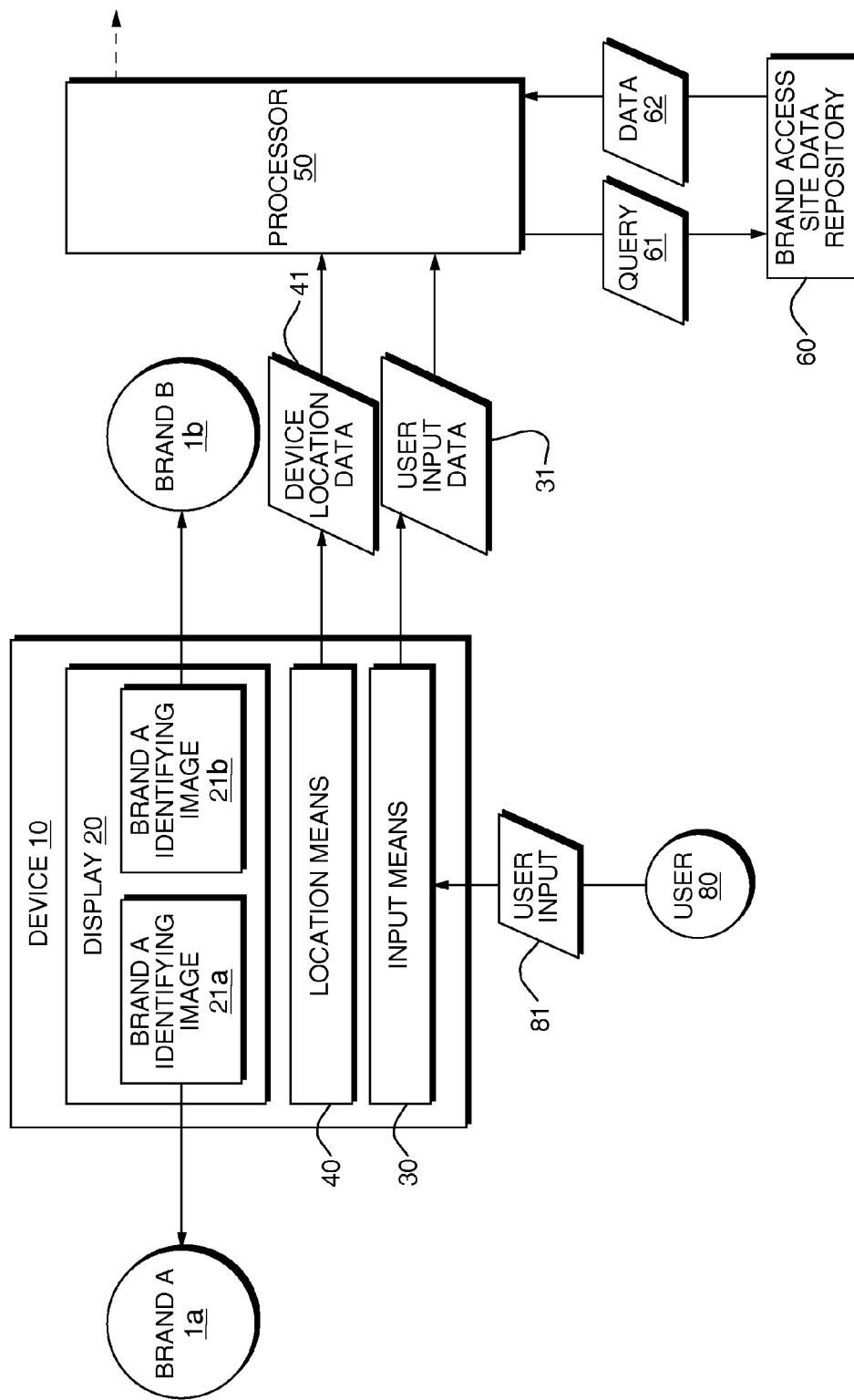
FIG. 2A is a schematic diagram of a first state of a system implemented according to one embodiment of the invention, prior to or during user inputs being communicated to a processor.
Figure 2B:
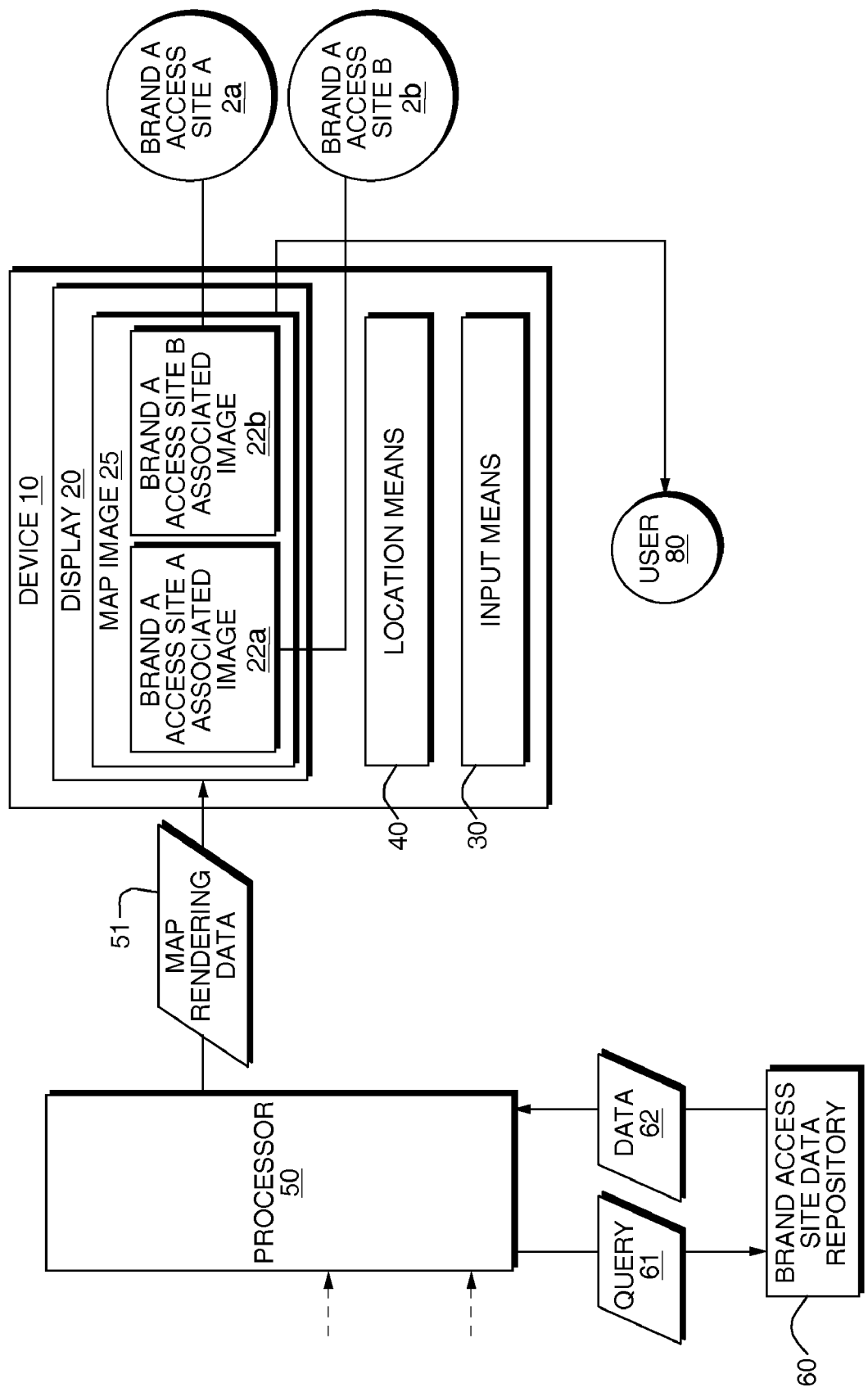
FIG. 2B is a schematic diagram of a second state of the system of FIG. 2A, after display of a map image.

Referring to FIGS. 2A-2B, an embodiment of the present invention is shown in which a brand 1a is accessible at multiple brand access sites 2a-b. Each of brand access sites 2a-b may be, for example, a real property location (e.g., a structure having an address) such as a store, shop, market, office, restaurant, service station, movie theater, event venue, etc. In addition, each of brand access sites 2 may be an alternative type of location, such as a free-standing vending machine, kiosk, mobile sales unit, or other location where products or services of brand 1a may be accessed (e.g., purchased), irrespective of whether or not the location is associated with a real property address.

As an example, if brand 1a is associated with Coke-branded beverage products (comprised of such beverages as regular Coke, Diet Coke, Cherry Coke, etc.), such products may be accessed (e.g., purchased) at thousands of brand access sites, including but not limited to stores, markets, restaurants, vending machines, event venues, etc. Brand access site 2 locations where products or services of brand 1a are accessible may remain stable (i.e., fixed in number), or may change over time, with a change in inventory levels or distribution, for example. For example, Product "Y" may be sold in 1,000 brand access sites today, and due to large demand, may only be available for purchase in 900 brand access sites tomorrow (meaning, for example, that 100 of the brand access sites have stocked out). As another example, Product "Z" may be sold in 100 brand access sites today, and 200 brand access sites a year from today.

Referring to FIG. 1A, a device 10 according to one embodiment of the invention is shown. The device 10 has a display 20, an input means 30, and an application launch means 11.

Device 10 may, for example, be a mobile phone, a wireless communications device, a personal digital assistant (PDA), computer, laptop computer, other computing device, global positioning system (GPS) unit, or other navigation device. In general, device 10 may be any system or device that enables a user 80 to input a selection of a brand (by means of selection of a brand identifying image) and view a map image indicating a device location and showing the location(s) where products or services of the selected brand are accessible. The example device 10 shown in FIG. 1A is multifunctional, including functions that relate to communication, personal organization, etc.

In one embodiment, display 20 is an electronic display (output means) of a type commonly found on mobile phones or similar small portable computing or communication devices. In another embodiment, display 20 is an electronic monitor or screen of the type commonly found on laptop computers. In other embodiments, display 20 may be any element or mechanism that communicates information to user 80. Display 20 may be small or large, active or passive, high resolution or low resolution, color or monochrome, and may generally employ any type of display technology. Display 20 may be any of a wide range of dimensions, from a small size that is usable on a small mobile phone, to a size that is more commonly found on a laptop computer, and larger. For example, display 20 may be a 5 centimeter high by 5 centimeter wide touch-screen display that serves as both a display 20 and input means 30. An example of an integrated display 20 and input means 30 is shown in FIG. 1A.

In one embodiment, input means 30 is a touch-sensitive display that enables user 80 to view information on display 20, and then to select an element of the information that is presented by touching the screen with a finger or other pointing or touching means. In such an embodiment, input means 30 and display 20 may be integrated into a single device. In another embodiment, input means 30 is a mechanical keypad.

In other embodiments, input means 30 may be any other mechanism that enables user 80 to communicate information to the device 10. Other input means 30 may be mechanical or electronic, and may involve physical or other interactive processes between user 80 and the input means 30. For example, voice commands and thought commands are two possible alternative ways of communicating with input means 30.

In one embodiment, application launch means 11 is a virtual or physical button that starts, launches, or brings into view an embodiment of the invention on device 10. Other launch means are possible, and one possible embodiment excludes application launch means 11 altogether. FIG. 1A shows an icon as one possible embodiment of application launch means 11.

In one embodiment, as shown in FIG. 1B, display 20 may show an arrangement of one or more brand identifying images 21, such as an arrangement or one or more logos. In the particular embodiment shown in FIG. 1B, brand identifying images 21 are arranged in two categories, with brand identifying images 21a-d being shown as "favorites," and brand identifying images 21e-h being shown as "popular". Each brand identifying image, 21a for example, is a graphic such as a logo, picture, illustration, photograph, or any other image that identifies a particular brand. For example, brand identifying image 21a is an image of a logo for Apple Inc. and may represent one or more Apple brands such as Apple computers, iPod music players, iTV systems, and more (as an alternative that is not shown, an image of an iPod may be used to identify the iPod brand of products). As another example, brand identifying image 21b is an image of a logo for Starbucks Corporation and may represent Starbucks coffee and other Starbucks products or services, for example.

In an embodiment of the invention, brand identifying images 21 are searchable. In another embodiment of the invention, brand identifying images 21 are sortable. In yet another embodiment of the invention, brand identifying images 21 are arrangeable on display 20 in other ways. In yet another embodiment of the invention, brand identifying images 21 may be either static or dynamic (i.e., a dynamic image is one that changes or moves, or that can be made to change or move).

In one embodiment, as shown in FIG. 1C, display 20 shows a map image 25 that includes one or more brand access site associated images 22.

In general, map image 25 is a visual depiction or representation of a geographic area, physical area, or space, that is rendered on display 20. In one embodiment, as shown in FIG. 1C, map image 25 shows a graphic that includes street-level detail. Map image 25 may be rendered in color or monochrome. Map image 25 may be labeled or unlabeled. Map image 25 may be static or moving (i.e., a moving map image 25 is one that is updated to generally correspond with the movement of device 10). In other embodiments, map image 25 may be scalable (e.g., zoom in, zoom out), shiftable (e.g., re-centerable left or right, up or down), or rotatable (e.g., re-orientable about a point).

Map image 25 may, for example be two-dimensional or three-dimensional. Map image 25 may, for example, represent an area or space using a photograph or photorealistic image, or using a stylized representation (such as commonly used on a street map or road atlas). Map image 25 may or may not be drawn to scale. Map image 25 may include combinations of various features just described. For example, map image 25 may include a superimposition of a stylized representation over a photorealistic representation, such as lines and street names superimposed on photorealistic images of streets.

Preferentially, map 25 image shows a geographic area that is generally accessible to user 80 (i.e., a local area). Such area may be optimally scaled for device 10 according to the movement characteristics (e.g., speed, direction) of device 10. For example, if device 10 is being moved at a slow pace (by a person who is walking with device 10, for example), then device 10 may provide a map image 25 showing a relatively small geographic area that is accessible by foot. In another example, if device 10 is being moved at a fast pace (by a person who is driving with device 10, for example), then device 10 may provide a map image 25 showing a larger geographic area that is accessible by car. For example, one possible map image 25 may show an area of 100 city blocks. In another example, map image 25 may show an area of a square kilometer or other region. Other map image 25 areas are possible. In yet another example, map area 25 may show the interior of a retail store.

In one embodiment, an example of which is shown in FIG. 1C, map image 25 includes one or more brand access site associated images 22. For example, map image 25 shown in FIG. 1C shows two brand access site associated images 22a-b, each of which is presented as a small dot (circle) that is superimposed onto (included as an element of) map image 25. Each of the brand access site associated images 22 represents the location of a unique one of the brand access sites 2. As previously described, brand access site 2a is a first location at which products and/or services of brand 1a are generally available for purchase, and brand access site 2b is a second location at which products and/or services of brand 1a are generally available for purchase.

In one embodiment, brand access site associated images 22a-b represent particular brand access sites 2a-b. Brand access site associated image 22a may, for example, be an image of a logo (such image of a logo may be significantly smaller than brand identifying image 21a, for example) identifying the corresponding brand 1a. In another embodiment, brand access site associated image 22a is an image of a product having the corresponding brand 1a, such as an illustration or photo (such image may be relatively small so as not to adversely affect the usability of map image 25, for example). In yet another embodiment, brand access site-associated image 22a is a shape, such as a small circle (dot), as shown in FIG. 1C as brand access site associated images 22a-b. In the case where multiple brand access site 2 locations are represented on map image 25 by multiple brand access site associated images 22, each of the brand access site associated images 22 may be unique, or each group of related brand access site associated images that are affiliated with the same brand may be the same or similar image—and different from brand access site associated images that are associated with other brands, for example. For example, two different ones of the brand access site associated images 22 may be presented as two different colors of dots on map image 25. Furthermore, brand access site associated images 22 may include other information or indicate other characteristics. For example, brand access site associated images 22 may indicate the availability (either generally, or specifically by means of indicating a number of available units, for example) of products/services of brand 1a that are available for purchase at the particular brand access sites 2a-b represented by the particular brand access site associated images 22a-b. In another example, brand access site associated image 22a may indicate whether brand access site 2a is open or closed for business at the time of display of the brand access site associated image 22a on map image 25.

In summary, an embodiment of the invention has a device 10, display means 20, and input means 30. Display means 20 and input means 30 may be incorporated into a single element, such as a touch-screen display. Display 20 may present one or more brand identifying images 21, each of which is associated with a corresponding brand. Furthermore, display 20 may present map image 25 that shows one or more brand access site associated images 22*a-b*, which are associated with brand access sites 2*a-b*, respectively.

In one embodiment, represented in FIG. 2A, the invention is shown in a first state. The term "first state" is defined as a state of the device 10 prior to or during communication of a brand identifying image 21 selection from device 10 to processor 50.

In one such embodiment, as shown in FIG. 2A, device 10 includes display 20, input means 30, and location means 40. Display 20 is shown having two brand identifying images 21*a-b*. In this embodiment, brand identifying image 21*a* is associated with a first brand 1*a*, and brand identifying image 21*b* is associated with a second brand 1*b*.

A user 80 provides user input 81 to device 10 by means of input means 30. User input 81 may be an indication of a selection of a particular brand identifying image that is of interest to user 80. For example, assume that user 80 indicates a selection of a particular brand identifying image 21*a* in order to view a map image 25 showing the location of brand access sites 2 associated with the particular brand 1*a* that is of interest to user 80. Subsequent to the communication by user 80 of user input 81 to input means 30 of device 10, device 10 (either directly or indirectly, possibly using any of a wide variety of means) communicates user input data 31 (information about user 80's selection of the brand identifying image 21*a*) to processor 50. In one embodiment, the communication of information about user 80's selection of the particular brand identifying image 21*a* from device 10 to processor 50 is performed wirelessly.

In one embodiment, location means 40 is any mechanism, process, or means that enables identification of device 10's location. For purposes of the invention, device 10's location is intended to be reasonably specific, such as may be determined by a GPS unit, other satellite-enabled location identification system, or other location-identifying means. Identification of location of device 10 is performed independently of location-specifying information provided by user 80 to device 10. For example, device 10's location may be determined without any input of an address, zip code, etc. by user 80. In one embodiment, location means 40 is physically integrated as an element of device 10, such as an integrated GPS (or similar type of) unit. In another embodiment, location means 40 is physically separate from device 10, such as identification of device 10 location based on triangulation by a remote system that includes one or more radio (e.g., cell phone) antennas, for example. A RFID system that is associated with a RFID-enabled environment is another example of a possible device 10 location means 40. In one embodiment, once location means 40 determines device 10's location, information about device 10's location—device location data 41—is communicated (directly or indirectly, possibly using any of a wide variety of means) to processor 50. In one embodiment, the communication of device location data 41 from location means 40 to processor 50 is performed wirelessly. In another embodiment of the invention, device location data 41 is communicated from location means 40 to another element of a system of the invention.

In one embodiment, as shown in FIG. 2A, processor 50 is a means that uses user input data 31 and device location data 41 in order to process this (and possibly other) data. In one embodiment, processor 50 is physically integrated into device 10. In another embodiment, processor 50 is physically separate from device 10. For example, processor 50 may exist in a fixed location. In the case that processor 50 is physically integrated into device 10, input means 30 and location means 40 may communicate user input data 31 and device location data 41, respectively, to processor 50 using direct physical connection (e.g., wires), for example. In the case that processor 50 is physically separate from device 10, device 10 and location means 40 may communicate user input data 31 and device location data 41, respectively, to processor 50 using wireless means, for example.

In one embodiment, processor 50 receives user input data 31 that provides information about a selection of brand identifying image 21*a* by user 80, and device location data 41 that provides information about a device 10 location. Processor 50 may be, for example, a computer or other electronic device, or system of connected computers or electronic devices, capable of processing the relevant information. Processor 50 processes the inputs to generate a query 61 to a brand access site data repository 60 which may be incorporated as an element of processor 50, or separate from processor 50. Brand access site data repository 60 may be a database or any other means (or multiple databases or other means) that contains information about brand access sites 2 and other brand access sites (not shown). Such information may include for each of the brands 1*a-b* (and for other brands, not shown) or brand identifying images 21*a-h*, an address, geographic coordinates, or other location specifying information for brand access sites relating to the particular brand or brand identifying image, for example. Following query 61 of brand access site data repository 60, brand access site data repository responds and communicates data 62 for processor 50, such data 62 comprising information about brand access sites 2 that are associated with the specified brand 1*a* or brand identifying image 21*a*. Such data 62 enables the rendering of map image 25 that includes brand site associated images 22. In one embodiment, brand access site data repository 60 is located in a single location (i.e., a central database). In another embodiment, brand access site data repository 60 is distributed, or located in multiple locations (i.e., information on pages that are available on multiple Internet sites). In yet another embodiment, brand access site data repository is an element of device 10, such as a database of brand access site 2 data that is stored in a memory of device 10. Any brand access site data repository 60 containing brand access site 2 information may be updatable.

In one embodiment, brand access site data repository 60 may be informed relative to actual inventory or availability (e.g., number of units of a product that are available, starting time or times of a movie showing or other event) of products or services of the brand 1*a* at each of the particular brand access sites 2. For example, if products or services of the selected brand 1*a* are not available at brand access site 2*a*, then particular brand access site 2*a* may not be communicated to processor 50 (or, alternatively, may be communicated but not shown on map image 25 as brand access site associated image 22*a*). In another embodiment, brand access site data repository 60 is informed relative to actual inventory or availability of products or services of brand 1*a* at brand access site 2*a*, and inventory or availability details are communicated by brand access site data repository 60 to enable device 10 display 20 to display map image 25 having brand access site associated images 22 that indicate, for example, the number of available units of a product or service of brand 1*a* that is being sought by user 80. Alternatively, in another embodiment, movie starting time(s) may be indicated. Such a feature would be particularly helpful for some products that are poorly stocked or only available at certain times, or in the instance when user 80 is seeking to purchase a relatively large number of units of a product of brand 1a, for example. In conjunction with such a feature, the device 10 may enable user 80 to indicate the number of units the user 80 is seeking to access (or similar parameter), in response to which the map image 25 may only include brand access site associated images corresponding to brand access sites at which at least the number of units specified by the user 80 are accessible (or at which another parameter is observed). The information contained in brand access site data repository 60 may be provided, in turn, by other systems, including but not limited to store inventory systems, RFID-enabled systems, event or movie show time listings, and any other means of determining, tracking or recording the availability of products or services.

In one embodiment, processor 50 incorporates a map image data source. In the embodiment shown in FIGS. 2A and 2B, for example, the map image data source is an element of processor 50. In another embodiment, a map image data source may be separate from processor 50 and may be queried or otherwise accessed by processor 50 in order to access map image data. In such an embodiment, processor 50 may communicate information to the map image data source which may, in turn, communicate map image data back to processor 50 for (possibly) further processing and communication to device 10 to enable the rendering of map image 25 on display 20. Alternatively, processor 50 may communicate information to a map image data source which may, in turn, communicate map image data including brand access site data directly to device 10 to enable the rendering of map image 25 on display 20. Other embodiments of accessing, processing and communicating map image data are possible, and envisioned and consistent with embodiments of systems and methods of the invention. While there are multiple possible map image data sources available, one example is the Google Maps Application Programming Interface (API) provided by Google, Inc.

In one embodiment, represented in FIG. 2B, the invention is shown in a second state. The term "second state" is defined as a state of the device 10 after display of a first (initial) map image 25 on device 10 display 20.

In one embodiment, map rendering data 51 is communicated from processor 50 to device 10, as shown in FIG. 2B. In other embodiments, map rendering data 51 may be provided to device 10 from other sources or elements of an embodiment of a system of the invention.

FIG. 2B shows many of the same elements as shown in FIG. 1A, however FIG. 2B differs since it represents an embodiment of the device 10 in a second state, including showing device display 20 that now includes map image 25.

Map image 25 includes one or more brand access site associated images 22 (although, in one embodiment, no brand access sites associated images 22 would be displayed on map image 25 if no brand access sites exist within the geographic area indicated by the particular map image 25, for example). Brand access site associated image 22a represents a location on map image 25 of a first brand access site 2a. Brand access site associated image 22b represents a location on map image 25 of a second brand access site 2b. In FIG. 1C, each of the two brand access site associated images 22a-b is presented as a small dot (circle) on map image 25. Such shape may be colored if display 20 is a color display. Map image 25 includes brand access site associated images 22 that are viewable by user 80 to facilitate user 80 identification of brand access sites 2 where products or services of a particular brand 1a of interest to user 80 may be accessed (e.g., purchased).

The second state may be modified ("modified second state") to reflect a new or changed location of device 10 (and presumably the new or changed location of user 80 who is using device 10). For example, map image 25 may be re-rendered to reflect a new or changed location of device 10. For example, if device 10 is traveling with user 80 in a moving car, then a second state may be changed to a modified second state, either automatically (e.g., continuously, frequently, periodically), or by prompting (e.g., user input, setting, directive), to show a re-rendered map image 25 that is, for example re-centered to reflect a new location of device 10, and that shows a new set (as appropriate) of brand access site associated images—meaning those images for brand access sites (if any) that are within the area described by the re-rendered map image 25. A modified second state can be repeatedly realized at various intervals to show an updated ("moving") map image 25 that is relevant to user 80 of device 10 according to current device 10 location and device location data 41.

The device 10 may be returned to the first state, such as by reinitializing the device 10, or in response to input from the user 80 indicating a desire to identifying brand access sites for another brand. As a result, the method 100 of FIG. 3 may be performed multiple times using the same device 10 to identify and display locations of brand access sites for different brands.

Embodiments of the invention may also allow map image 25 to be modified in other ways. For example, user 80 may use input means 30 to change map image 25 scale to provide various levels of detail (i.e., zoom in or out). Also, for example, user 80 may use input means 30 to change map image 25 centering (i.e., to scroll or shift the image in a desired direction). Also, for example, user 80 may change map image 25 orientation of (i.e., rotation), possibly to adjust for the orientation of display 20 when device 10 is being used. In addition, brand access site associated images 22 shown on map image 25 may be manipulable, or may be selectable by user 80 using input means 30.

In the case that an embodiment of the invention further provides a means for user 80 to select one or more brand access site associated images 22 on map image 25, such selection may, for example, provide user 80 with a menu or list of further functions. For example, user 80 may select one of the brand access site associated images 22 to, for example: initiate a phone call to the selected brand access site, prompt (a person associated with) the selected brand access site to contact user 80 on device 10, place an order for products or services of the selected brand 1a, determine inventory of products having the selected brand 1a, check the hours of operation or availability of the selected brand access site, make certain brand access site associated images 22 a default feature on all map images 25 displayed to user 80, denote a particular one of the brand access sites 2 as a favorite, default, etc. While such a subsequent action or actions may be facilitated by a menu or list, embodiments of the invention may also be configured to enable user 80 to access a particular action by a single click on a button (or other form of input). For example, in one embodiment, user 80 may enable a phone call using device 10 by using input means 30 to simply select one of the (i.e., click on) brand access site associated images 22 on map image 25. Other embodiments may include other map image 25 enabled functions.

Figure 3:
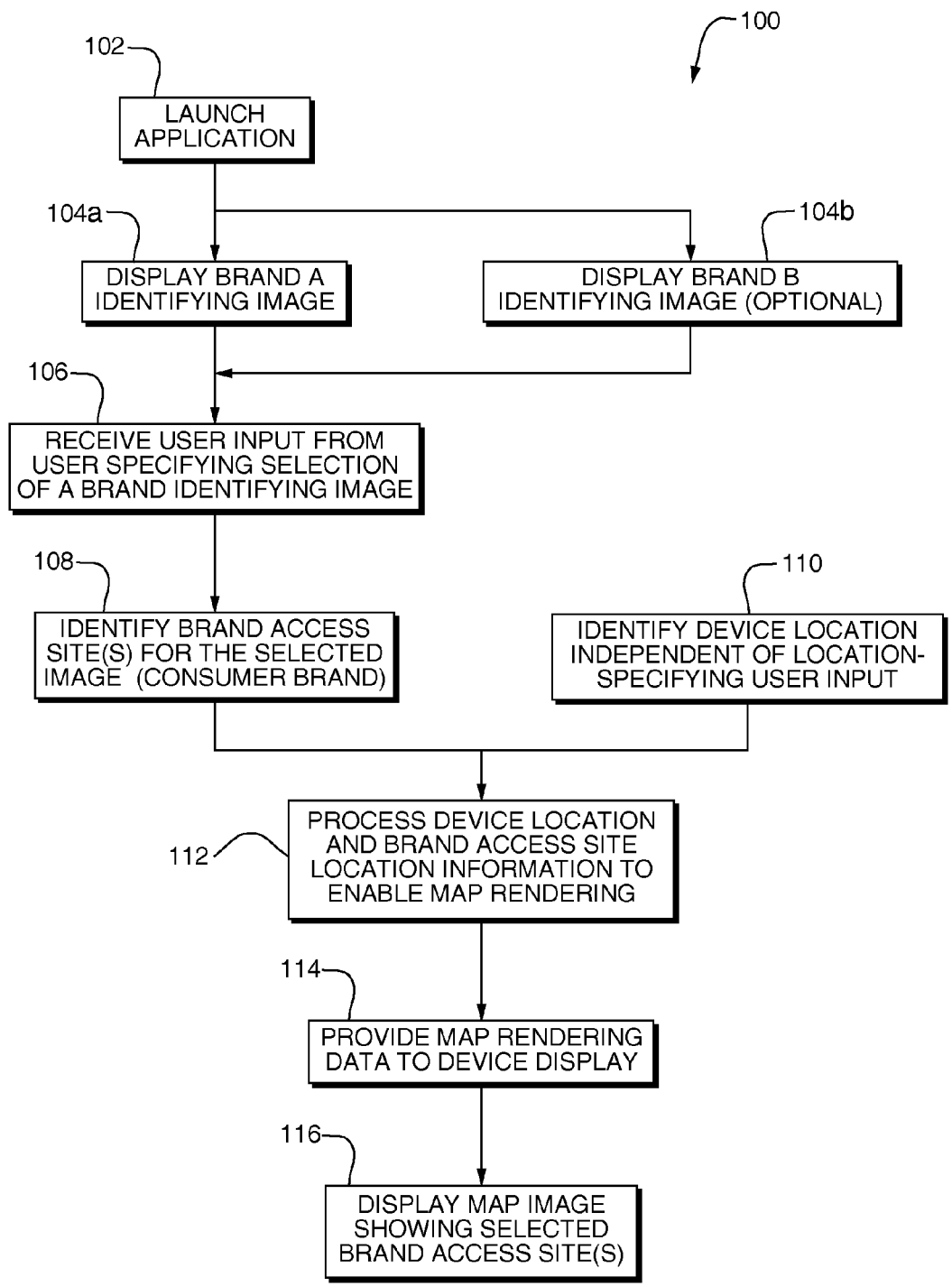
FIG. 3 is a flowchart of a method performed according to one embodiment of the present invention.

FIG. 3 shows a flowchart of a method 100 according to an embodiment of the invention. The method 100 is initiated or launched (step 102). This step may be facilitated, for example, by using a button or virtual button represented by application launch means 11 shown FIG. 1A.

Next, display means 20 displays a first brand identifying image, an example of which is the brand identifying image 21a shown in FIG. 1B (step 104a). Optionally, display means 20 may concurrently show a second brand identifying image, an example of which is the brand identifying image 21b shown in FIG. 1B (step 104b). Display means 20 may present even more brand identifying images (possibly resembling brand identifying images 21c-h shown in FIG. 1B, for example). Brand identifying images 21 may be shown or presented in a single set or in subsets, and may be searchable, sortable, arrangeable, scrollable, etc.

Next, method 100 receives user input 81 from user 80 specifying a selection of a particular brand identifying image that is associated with a particular brand of interest to user 80 (i.e., a brand that user 80 desires to locate by means of map image 25) (step 106). Assume for purposes of example in the following discussion that user 80 selects brand identifying image 21a to indicate that user 80 is interested in brand 1a.

The method 100 applies user input 81 to identify brand access sites 2 for the particular brand 1a of interest to user 80 (step 108). This step may be performed by processor 50 whereby processor 50 generates a query 61 to brand access site data repository 60, in response to which brand access site data repository 60 replies with location-identifying information about brand access sites 2 for the particular brand 1a of interest to user 80. Brand access site data repository 60 may be, for example, a single database, multiple databases, a website or website page, multiple websites or website pages, or other Internet-accessible source of information, user-generated data, or other means that may be queried by processor 50 and which provides the relevant information. Furthermore, query 51 to brand access site data repository 60 may be general or specific, meaning that it could seek to identify all brand access sites for the selected brand 1a (and then use only those that are relevant to the geographic area being presented on a current map image 25), or it could query the brand access site data repository 60 in a manner that enables it to secure a relevant subset of data.

Another step may occur before, concurrent with, or after step 108 (step 110). In step 110, method 100 identifies a location of device 10 independent of location-specifying user input. As used herein, "independent of location-specifying user input" means that the method 100 does not rely on user 80 to input location-specifying information such as an address, zip code, phone number, etc. Rather, location of device 10 is identified by the method 100, either by means that may be physically incorporated as an element of device 10, such as a built-in GPS unit or similar technology, or that are remotely or externally incorporated as an element of a system implemented according to an embodiment of the invention, such as by a system that uses triangulation, direction-finding, signal strength, a RFID system, or other means to determine location of device 10 independently of location-specifying user input.

Next, method 100 processes device 10 location (by applying device location data 41) and brand access site information (by applying data 62) to enable map image 25 rendering (step 112). In one embodiment, map image 25 rendering is supported by information supplied by a map image data source. Map image 25 rendering information is then communicated to enable device display 20 to render map image 25 showing a geographic area overlapping with a location of device 10 and which includes brand access site associated image(s) 22 which represent brand access site(s) 2 for the brand 1a indicated to be of interest to user 80 by user 80 in step 106 (step 116). If there are no brand access sites within the geographic area shown by map image 25, then no brand access site associated images will be indicated on map image 25.

Next, device 10 displays map image 25 to user 80 on display 20 (step 116). Map image 25 shows a geographic area overlapping with a location of device 10 (and presumably user 80 who is using device 10) and which includes brand access site associated image(s) 22 which represent brand access site(s) 2 for the brand 1a indicated to be of interest to user 80 by user 80 in step 106. If there are no brand access sites within the geographic area shown by map image 25, then no brand access site associated images will be indicated on map image 25.

In one embodiment, map image 25 may be modified. For example, user 80 may use input means 30 to change map image 25 scale to provide various levels of detail (i.e., zoom in or out). Also, for example, user 80 may use input means 30 to change map image 25 centering (i.e., to scroll or shift the image in a desired direction). Also, for example, user 80 may change map image 25 orientation of (i.e., rotation), possibly to adjust for the orientation of display 20 when device 10 is being used. In addition, brand access site associated images 22 shown on map image 25 may be manipulable, or may be selectable by user 80 using input means 30.

The map image 25 may display brand access site associated images which are associated with brands not selected by the user 80 in step 106. For example, if the user 80 has previously selected one or more brands as "favorite" brands, the device 10 may include, in the map image 25, brand access site associated images associated with the user-indicated favorite brand(s) (if any such sites are within the area represented by the map image 25). The map image 25 may include such representations of "favorite" brand access sites in addition to images (if any) associated with brand access sites corresponding to the brand selected by the user 80 in step 106. Similarly, the device 10 may include, in the map image 25, brand access site associated images associated with brands previously stored as "default" brands. As a result, the map image 25 may include brand access site associated images associated with multiple brands even if the user 80 selects only a single brand in step 106. Similarly, the map image 25 may include brand access site associated images associated with one or more brands even if the user 80 does not select any brands in step 106. The user 80 may, for example, quickly obtain a view of brand access sites associated with favorite and/or default brands that are currently in the vicinity of the device 10 by providing no input in step 106. The device 10 may facilitate this process by, for example, allowing the user 80 to bypass step 106 using a keypress or by issuing a "display favorites" or "display defaults" command which displays a map image illustrating brand access sites for favorite and/or default brands in the vicinity of the device 10 without requiring any further input from the user 80.

These are merely examples of ways in which the device 10 may display brand access sites to the user 80 for brands not previously selected by the user 80. Another example in which a similar result is achieved is that in which an advertisement system, such as a push advertisement system, displays brand access site associated images in the map image 25 for brands not previously selected by the user 80. Such images may, however, be selected based on a determination of which brand (s) the user 80 is likely to find of interest. Such a determination may be made, for example, based on demographic data, previous activity of the user 80, or any of a variety of other techniques.

In the case that an embodiment of the invention further provides a means for user 80 to select one or more brand access site associated images 22 on map image 25, such selection may, for example, provide user 80 with a menu or list of further functions. If, for example, user 80 selects brand access site associated image 22a, such selection may enable the user 80 to, for example: initiate a phone call to the brand access site 2a, have a person associated with the brand access site 2a contact user 80 on device 10, place an order for products or services of the selected brand 1a, determine inventory of products or services of the selected brand 1a, check the hours of operation or availability of the selected brand access site 2a, make brand access site associated images 22 a default feature on all map images 25 displayed to user 80, denote the brand access site 2a as a favorite, etc. While such a subsequent action or actions may be facilitated by a menu or list, embodiments of the invention may also be configured to enable user 80 to access a particular action by a single click on a button (or other form of input). For example, in one embodiment, user 80 may enable a phone call using device 10 by using input means 30 to simply select (i.e., click on) brand access site associated image 22 on map image 25. Other embodiments may include other map image 25 enabled functions.

In one embodiment of the invention, a single action or manipulation of device 10 input means 30 by user 80 (e.g., selection of a brand identifying image 21), or the receipt of a single input by device 10 (e.g., method 100 step 106), results in the display of map image 25 showing any brand access sites 2 for the brand 1a associated with the brand identifying image 22 that was selected by user 80.

In one possible sample use case, the presentation of which is intended as an example of a use of embodiments of the invention and shall not limit the scope of the invention in any way, user 80 of a device that is similar to device 10 shown in FIG. 1A views on display similar to display 20 shown in FIG. 1B an arrangement of ten images similar to brand identifying images 21a-f shown in FIG. 1B, each of which represents one of ten different brands. For example, three images represent brands that are beverages, two of the images represent fast-food products, and five of the images represent consumer durable goods. User 80 may manipulate the images. For example, using device 10 input means 30, user 80 may scroll through, or sort the images. One of the beverage brands, a particular soda, is of interest to user 80. User 80 uses device 10 input means 30 to select the image that identifies the particular brand (soda) of interest. Following this input indicating a selection of an image by user 80, user 80 is then presented with a map image, similar to map image 25 shown in FIG. 1C, that is centered about the current location of device 10 (and user 80 who is using device 10). The map image in this example also includes three images showing where the soda product can be purchased, these images being similar to brand access site associated images 22 shown in FIG. 1C. The images are representative of locations (e.g., stores, vending machines, etc.) that are located nearby the user 80, and where user 80 may purchase the brand of soda of interest. User 80 uses the information to walk to a nearby location to buy a soda.

In this sample use case, it is notable that the user arranges (e.g., scrolls through) and selects an image that identifies a specific brand. It is also notable that the user does not enter (e.g., input) any location-specifying information into the device; the system automatically determines a location of the device (and presumably the user who is using the device) independent of location-specifying input provided by the user to the device. Furthermore, it is notable that the system provides information to the user about the location of places where the product may be accessed (e.g., purchased).

Among the advantages of embodiments of the invention are one or more of the following. Embodiments of the present invention advantageously enable a user to use a device to select a brand-identifying image, and in response to see a (possibly moving and/or updated) map of a region where the device/user is located and which indicates (such as by using icons) locations at which the user-selected brand. Such embodiments thereby enable the user to see where products or services of a brand (i.e., products or services of a particular brand) of interest to the user may be available for purchase, with minimal effort from the user. For example, in one embodiment the user may cause the device to display such a map simply by selecting (e.g., clicking on) the brand-identifying image (e.g., image of a logo). In response to this single action, the device and/or other components of the system may automatically identify both the location of the device (such as by using GPS) and locations in the vicinity of the device at which products/services of the user-selected brand may be accessed (such as by accessing a database of brand access sites). In particular, in such embodiments, the user need not provide input specifying the user/device's current location (such as by typing in an address or zip code).

Furthermore, these techniques enable the user to enter a selection of a brand, but not a location of the user, and to be presented with a map showing the location(s) of brand access sites. As a result, the amount of effort required on behalf of the user is reduced in comparison to systems which require the user to input explicit location-identifying information, or which require a user to guess as to where products or services of a particular brand might be located.

The techniques disclosed herein also enable brand manufacturers (and other parties) to promote their brands using brand identifying images first and foremost on a user interface. Embodiments of the invention enable brand-centric marketing. Such techniques therefore represent an improvement over systems which are purely text-based or which otherwise do not prominently display brand-identifying images to the user proactively, or which do not enable display of brand identifying images in such a controllable manner. For example, the logos 21a-h in FIG. 1B may be displayed to the user repeatedly over time even if the user never selects any of the logos 21a-h. As a result, the display shown in FIG. 1B would promote the brands associated with logos 21a-h regardless of the user's actions. Other embodiments of the invention may enable intelligent presentation of brand-identifying images, such as logos, to users.

The techniques disclosed herein further enable a user interested in attending a movie showing (e.g., Star Wars Episode 1) or attending another event (e.g., Cirque-du-Soleil Quidam) to select an image of the movie or other event, and to be presented with a map showing the locations where the movie or other event may be viewed. Furthermore, the user may be enabled to view information about the particular movie or other event, or the user may be enabled to select or narrow a timeframe to see a subset of locations where the movie or other event may be viewed or experienced at particular times. A movie showing or other event is a branded entity when it is accessible (e.g., available for viewing) at multiple locations, i.e., a motion picture showing at multiple venues represents a collection of related products or services having a distinctive identity.

The techniques disclosed herein may also be used to enable a shopper in an interior retail environment to select an image that is representative of a particular brand, and to be shown the in-store (aisle or shelf) location of the particular brand on a map that shows a representation of the interior of the retail environment.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain embodiments disclosed herein are used in conjunction with mobile devices, this is not a requirement of the present invention. Rather, the techniques disclosed herein may be used in conjunction with devices that are fixed (such as desktop computers). Furthermore, although certain embodiments disclosed herein are used in conjunction with handheld devices, this is not a requirement of the present invention. Rather, the techniques disclosed herein may be used in conjunction with devices of any size, such as laptop and desktop computers.

Although certain embodiments are described herein as being used in conjunction with a wireless network connection, this is not a requirement of the present invention. Rather, the techniques disclosed herein may be used in conjunction with network communications that occur wirelessly or over wires, or more generally over any communications medium. Furthermore, the techniques disclosed herein may be used in conjunction with any appropriate network protocol.

Although components of certain embodiments disclosed herein are described as communicating with each other over a network, the particular examples disclosed herein are not limitations of the present invention. For example, the location of the device may be identified by a component within the device itself or by a component external to the device which communicates with the device or with another element of the invention. Similarly, the locations of brand access sites may be identified by a component within the device itself or by a component external to the device which communicates with the device. This may involve a database or data repository.

The user may select one or more brands in any of a variety of ways. For example, as illustrated in FIG. 1B, the device may present the user with output representing a plurality of brands 1, such as a plurality of logos that are affiliated with brands 1. Such output may, however, take other forms. For example, the device may provide the user with images of representative examples of branded entities rather than logos. Furthermore, the device need not provide the user with a set of simultaneously-displayed brand identifying images. For example, the device may allow the user to step through images one at a time until the desired image is found, or to utilize functions that enable searching, sorting, or other arrangement of the images.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory, for example. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method comprising:
    (A) displaying, using a device, a first image associated with a first brand;
    (B) receiving, from a user of the device, an indication of a selection by the user of the first image;
    (C) identifying a first location of the device independently of any location-specifying input provided by the user to the device;
    (D) identifying a first brand access site at which a first branded entity having the first brand is accessible; and
    (E) providing to the user, using the device, a first map image which describes a first geographic area derived from the first location of the device and which includes a first indication of the first brand access site, wherein the first indication of the first brand access site comprises a second image associated with the first brand, located at a position in the first map image corresponding to the first brand access site.

2. The method of claim 1, wherein (A) comprises displaying a plurality of images associated with a plurality of brands;
    wherein (B) comprises receiving, from the user of the device, an indication of a selection by the user of a particular one of the plurality of images associated with the first brand; and
    wherein (E) comprises providing to the user a first map image which describes a first geographic area derived from the first location of the device and which indicates a first physical location of a first brand purchase site at which the first branded entity may be purchased.

3. The method of claim 1, wherein (E) comprises providing to the user a first map which describes a first geographic area overlapping with the first location of the device and which indicates a plurality of brand access site associated images representing a plurality of brand access sites at which the first branded entity is accessible.

4. The method of claim 1, wherein (E) comprises:
(E) (1) identifying a plurality of brand access sites, each of which is associated with at least the first brand;
(E) (2) identifying a subset of the plurality of brand access sites, wherein each member of the subset is associated with the first brand; and
(E) (3) providing to the user a first map image which includes, for each brand access site that is a member of the subset, an indication of a brand access site.

5. The method of claim 4, wherein (D) (2) comprises identifying a subset of the plurality of brand access sites, wherein each member of the subset is associated with the first brand access site and has a location within the first geographic area described by the first map.

6. The method of claim 4, wherein (D) (2) comprises identifying a subset of the plurality of brand access sites, wherein each member of the subset has at least one branded entity of the first brand available for access at about a time step (D) (2) is performed.

7. The method of claim 1, wherein the first image comprises a logo associated with the first brand.

8. The method of claim 1, wherein the indication of the selection by the user comprises an indication of a single action of the user.

9. The method of claim 1, wherein (B) comprises receiving from the user an indication of a selection by the user of a plurality of images associated with a plurality of brands; and
wherein (E) comprises providing to the user, using the device, a first map image which describes a first geographic area overlapping with a location in proximity to the first device location and which includes a first indication of the plurality of brand access sites.

10. The method of claim 1, further comprising:
(F) receiving, from the user, input selecting the first brand access site; and
(G) performing a method based on the input.

11. The method of claim 10, wherein (G) comprises dialing a telephone number of the first brand access site.

12. The method of claim 10, wherein (G) comprises presenting to the user a web site associated with the first brand.

13. The method of claim 10, wherein (G) comprises providing directions to the first brand access site.

14. The method of claim 10, wherein (E) further comprises:
(E) (1) providing to the user a plurality of choices representing a plurality of methods;
(E) (2) receiving from the user input selecting one of the plurality of choices; and
wherein (F) comprises performing a method represented by the one of the plurality of choices selected by the user.

15. The method of claim 10, wherein (E) (2) comprises receiving the input provided by the user using a single action.

16. The method of claim 1, wherein the first image comprises a photograph associated with the first brand.

17. The method of claim 1, wherein the first image comprises an illustration associated with the first brand.

18. The method of claim 1, wherein the first branded entity comprises a product.

19. The method of claim 1, wherein the first branded entity comprises a service.

20. The method of claim 19, wherein the service comprises an event.

21. The method of claim 19, further comprising:
(F) receiving, from the user, an indication of a selection by the user of a time period during which the user is interested in using the service; and wherein (D) comprises providing to the user, using the device, a first map which describes a first geographic area derived from the first location of the device and which includes a first indication of a first brand access site at which the service is available during the user-selected time period.

22. The method of claim 19, wherein the service comprises a movie showing.

23. The method of claim 1, wherein the first brand access site comprises a parcel of real property.

24. The method of claim 1, wherein the first brand access site comprises a geographic location.

25. The method of claim 1, wherein the first brand access site comprises a retail store.

26. The method of claim 1, wherein the first brand access site comprises a movie theater.

27. The method of claim 1, wherein the first map image comprises a two-dimensional graphical map.

28. The method of claim 1, wherein the first map image comprises an interior map.

29. The method of claim 1, wherein the second image comprises a logo associated with the first brand.

30. The method of claim 1, wherein the second image associated with the first brand comprises a photograph associated with the first brand.

31. The method of claim 1, wherein the second image associated with the first brand comprises an illustration associated with the first brand.

32. The method of claim 1, wherein the second image associated with the first brand comprises an icon associated with the first brand.

33. The method of claim 1, wherein (C) comprises identifying the first device location using a Global Positioning System.

34. The method of claim 1, wherein (C) comprises identifying the first device location using a RFID system.

35. The method of claim 1, wherein (E) comprises providing to the user a first map image which describes a first geographic area overlapping with the first location of the device.

36. The method of claim 1, wherein the first indication of the first brand access site indicates a characteristic associated with the first brand access site.

37. The method of claim 36, wherein the characteristic comprises a count of branded entities of the first brand accessible at the first brand access site.

38. The method of claim 36, wherein the first branded entity comprises an event, and wherein the characteristic comprises a starting time of the first branded entity at the first brand access site.

39. A system comprising:
display means for using a device to display a first image associated with a first brand;
reception means for receiving, from a user of the device, an indication of a selection by the user of the first image;
device location means for identifying a first location of the device independently of any location-specifying input provided by the user to the device;
first brand access site location means for identifying a first brand access site at which a first branded entity having the first brand is accessible; and
map image provision means for providing to the user, using the device, a first map image which describes a first geographic area derived from the first location of the device and which includes a first indication of the first brand access site, wherein the first indication of the first brand access site comprises a second image associated with the first brand, located at a position in the first map image corresponding to the first brand access site.

40. The system of claim 39, wherein the display means comprises means for displaying a plurality of images associated with a plurality of brands;
wherein the reception means comprises means for receiving, from the user of the device, an indication of a selection by the user of a particular one of the plurality of images associated with the first brand; and
wherein the map image provision means comprises means for providing to the user a first map image which describes a first geographic area derived from the first location of the device and which indicates a first physical location of a first brand purchase site at which the first branded entity may be purchased.

41. The system of claim 39, wherein the map image provision means comprises:
means for identifying a plurality of brand access sites, each of which is associated with at least the first brand;
means for identifying a subset of the plurality of brand access sites, wherein each member of the subset is associated with the first brand; and
means for providing to the user a first map image which includes, for each brand access site that is a member of the subset, an indication of a brand access site.

42. The system of claim 41, wherein each member of the subset is associated with the first brand access site and has a location within the first geographic area described by the first map.

43. The system of claim 39, wherein the first image comprises a logo associated with the first brand.

44. The system of claim 39, wherein the first branded entity comprises a product.

45. The system of claim 39, wherein the first branded entity comprises a service.

46. A device comprising:
display means for displaying a first image associated with a first brand;
reception means for receiving, from a user of the device, an indication of a selection by the user of the first image;
device location means for identifying a first location of the device independently of any location-specifying input provided by the user to the device;
map image provision means for providing to the user, using the device, a first map image which describes a first geographic area derived from the first location of the device and which includes a first indication of a first brand access site at which a first branded entity having the first brand is accessible, wherein the first indication of the first brand access site comprises a second image associated with the first brand, located at a position in the first map image corresponding to the first brand access site.

47. The device of claim 46, wherein the display means comprises means for displaying a plurality of images associated with a plurality of brands;
wherein the reception means comprises means for receiving, from the user of the device, an indication of a selection by the user of a particular one of the plurality of images associated with the first brand; and
wherein the map image provision means comprises means for providing to the user a first map image which describes a first geographic area derived from the first location of the device and which indicates a first physical location of a first brand purchase site at which the first branded entity may be purchased.

48. The device of claim 46, wherein the map image provision means comprises:
means for identifying a plurality of brand access sites, each of which is associated with at least the first brand;
means for identifying a subset of the plurality of brand access sites, wherein each member of the subset is associated with the first brand; and
means for providing to the user a first map image which includes, for each brand access site that is a member of the subset, an indication of a brand access site.

49. The device of claim 48, wherein each member of the subset is associated with the first brand access site and has a location within the first geographic area described by the first map.

50. The device of claim 46, wherein the first image comprises a logo associated with the first brand.

51. The device of claim 46, wherein the first branded entity comprises a product.

52. The device of claim 46, wherein the first branded entity comprises a service.

53. A system comprising:
device location reception means for receiving an indication of a first location of a device;
first brand access site location means for identifying a first brand access site at which a first branded entity having a first brand is accessible; and
map image provision means for providing, to the device, first map rendering data for rendering a first map image which describes a first geographic area derived from the first location of the device and which includes a first indication of the first brand access site, wherein the first indication of the first brand access site comprises a second image associated with the first brand, located at a position in the first map image corresponding to the first brand access site.

54. The system of claim 53, wherein the map image provision means comprises:
means for identifying a plurality of brand access sites, each of which is associated with at least the first brand;
means for identifying a subset of the plurality of brand access sites, wherein each member of the subset is associated with the first brand; and
means for providing to the user a first map image which includes, for each brand access site that is a member of the subset, an indication of a brand access site.

55. The system of claim 54, wherein each member of the subset is associated with the first brand access site and has a location within the first geographic area described by the first map.

56. The system of claim 53, wherein the first indication comprises a logo associated with the first brand.

57. The system of claim 53, wherein the first branded entity comprises a product.

58. The system of claim 53, wherein the first branded entity comprises a service.

59. A method comprising:
(A) displaying, using a device, a first image associated with a first brand;
(B) receiving, from a user of the device, an indication of a selection by the user of the first image;
(C) identifying a first location of the device independently of any location-specifying input provided by the user to the device;
(D) identifying a first brand access site at which a first branded entity having the first brand is accessible;
(E) providing to the user, using the device, a first map image which describes a first geographic area derived from the first location of the device and which includes a first indication of the first brand access site;

(F) identifying a second device location independently of any location-specifying input provided by the user to the device; and (G) in response to identifying the second device location, providing to the user, using the device, a second map which describes a second geographic area overlapping with a location in proximity to the second device location and which includes a second indication of a second brand access site at which the first brand is accessible.

60. A method comprising:

(A) displaying, using a device, a first image associated with a first brand;

(B) receiving, from a user of the device, an indication of a selection by the user of the first image;

(C) identifying a first location of the device independently of any location-specifying input provided by the user to the device;

(D) identifying a first brand access site at which a first branded entity having the first brand is accessible; and (E) providing to the user, using the device, a first map image which describes a first geographic area derived from the first location of the device and which includes a first indication of the first brand access site;

wherein (D) further comprises providing within the first map a second indication of a second brand access site at which a second brand, not indicated by the selection by the user, is accessible.

61. A system comprising:

display means for displaying, using a device, a first image associated with a first brand;

reception means for receiving, from a user of the device, an indication of a selection by the user of the first image;

first device location means for identifying a first location of the device independently of any location-specifying input provided by the user to the device;

first brand access site location means for identifying a first brand access site at which a first branded entity having the first brand is accessible;

first map image provision means for providing to the user, using the device, a first map image which describes a first geographic area derived from the first location of the device and which includes a first indication of the first brand access site;

second device location means for identifying a second device location independently of any location-specifying input provided by the user to the device; and second map image provision means for providing to the user, using the device and in response to identifying the second device location, a second map which describes a second geographic area overlapping with a location in proximity to the second device location and which includes a second indication of a second brand access site at which the first brand is accessible.

62. A system comprising:

display means for displaying, using a device, a first image associated with a first brand;

reception means for receiving, from a user of the device, an indication of a selection by the user of the first image;

device location means for identifying a first location of the device independently of any location-specifying input provided by the user to the device;

first brand access site location means for identifying a first brand access site at which a first branded entity having the first brand is accessible, and for providing within the first map a second indication of a second brand access site at which a second brand, not indicated by the selection by the user, is accessible; and map image provision means for providing to the user, using the device, a first map image which describes a first geographic area derived from the first location of the device and which includes a first indication of the first brand access site.

* * * * *

UNITED STATES PATENT AND TRADEMARK OFFICE
CERTIFICATE OF CORRECTION

| | | |
|---|---|---|
| PATENT NO. | : 7,768,395 B2 | |
| APPLICATION NO. | : 11/758392 | |
| DATED | : August 3, 2010 | |
| INVENTOR(S) | : Steven K. Gold | |

It is certified that error appears in the above-identified patent and that said Letters Patent is hereby corrected as shown below:

In the drawings, on sheet 2, FIG. 2A, the text of element 21b should read, "BRAND B IDENTIFYING IMAGE 21b".

Signed and Sealed this
Twenty-sixth Day of June, 2012

David J. Kappos
*Director of the United States Patent and Trademark Office*